April 29, 1969   C. R. WAINWRIGHT   3,441,843
SYSTEM FOR TILTING FREQUENCY MARKER IN SWEEP GENERATOR DISPLAY
Filed June 8, 1966

INVENTOR.
CLAIRE R. WAINWRIGHT

INVENTOR
CLAIRE R. WAINWRIGHT

April 29, 1969  C. R. WAINWRIGHT  3,441,843
SYSTEM FOR TILTING FREQUENCY MARKER IN SWEEP GENERATOR DISPLAY
Filed June 8, 1966

INVENTOR.
CLAIRE R. WAINWRIGHT

BY
Woodard, Weikart, Emhardt & Naughton
Attorneys

United States Patent Office 3,441,843
Patented Apr. 29, 1969

3,441,843
SYSTEM FOR TILTING FREQUENCY MARKER IN SWEEP GENERATOR DISPLAY
Claire R. Wainwright, P.O. Box 277,
Laguna Beach, Calif. 92652
Filed June 8, 1966, Ser. No. 556,151
Int. Cl. G01r 27/00, 25/00, 23/14
U.S. Cl. 324—57                    20 Claims

ABSTRACT OF THE DISCLOSURE

A sweep generator circuit having a marker generator which produces a marker pulse when the sweep generator sweeps through a given frequency. The marker signal is added to both the horizontal and vertical outputs of the sweep generator which drive an oscilloscope. Attenuation of the marker signal added to each of the outputs may be varied selectively so that the marker signal which appears on the oscilloscope trace is selectively tilted from its normal vertical position. Additional attenuation is included to vary the amplitude of the tilted marker.

---

The present invention relates to sweep generators and more particularly to a marker system for a sweep generator.

The sweep generator is a device designed to replace the signal generator for performing tests to obtain amplitude versus frequency characteristics of a circuitry being designed, aligned, tested, etc. Sweep generators can be used for many assorted tests such as oscillator stability checks and spectrum analysis. Perhaps the most commonly used application of a sweep generator is the displaying on an oscilloscope of amplitude versus frequency characteristics of an unknown circuit. The output of the sweep generator is coupled to the device under test causing the device under test to have an output which is detected and displayed on the vertical axis of an oscilloscope. The output of the sweep generator is a varying frequency which varies with respect to time about a center frequency and between two outside frequencies $f1$ and $f2$. The horizontal input of the oscilloscope is received directly from the sweep generator and more particularly from the rate generator of the sweep generator.

The rate generator is usually considered a part of the internal circuitry of the sweep generator and functions to provide a properly phased oscilloscope horizontal drive, to provide the sweep oscillator drive, and to provide the sweep oscillator blanking signals. Of course, the "sweep drive" or "sweep oscillator drive" refers to the voltage provided by the rate generator for controlling the output frequency of the sweep oscillator. The oscilloscope horizontal drive is a voltage waveform which is in phase with the varying output frequency of the sweep generator whereby the display on the scope is the amplitude versus frequency characteristic bandpass of the device under test.

An accurate interpretation of the response curve displayed requires that the frequency at each point along the curve be known. This information is obtained by the introduction of frequency markers which consist of either a single voltage pulse or a short burst of rapidly changing voltage which produce, respectively, a "pulse" marker or "birdy" marker on the oscilloscope display. Thus, instead of coupling the output of the detector directly to the vertical input of the oscilloscope, the output is fed back to the sweep generator where an internally generated marker is added to the signal and the sum of both signals displayed on the oscilloscope. The marker frequency is usually identified by a calibrated frequency dial on the sweep generator. The above described sweep generators are well known in the art and are commercially available, one specific example being Model SM-2000 with a VR-2M Plug-In Head, a product of Telonic Industries, Inc. of 60 N. First Ave., Beech Grove, Ind.

One of the problems presented in such commercially availably equipment is that the marker, whether a birdy or a pulse, is difficult to observe when the response curve rises or falls sharply. For example, the skirts of a multi-section filter often produce an almost vertical response. Assuming, for example, that the shape of the marker is also a vertical line, it can be appreciated that the interception point of the marker and response curve of the filter cannot be easily seen. Consequently, it is an important object of this invention to provide a marker system making possible an accurate oscilloscope display which is easily interpreted and read by the viewer to determine the exact point of intersection of the response curve and marker.

A further object of the present invention is to provide an improved sweep generator.

Another object of the present invention is to provide an improved marker system for a sweep generator.

Still another object of the present invention is to provide a sweep generator marker system having substantial accuracy throughout a wide range of sweep widths and frequencies.

Related objects and advantages will become apparent as the description proceeds.

One embodiment of the invention might include a sweep generator having a marker system which produces a tiltable straight line marker. The marker is adjustable or tiltable to any slope so that it is perpendicular to the response curve at the point of interception of the response curve and the marker. Thus, for example, if the marker intercepts the response curve at a point where the response curve has a positive forty-five degree angle slope, the viewer can adjust the marker so that it has a negative forty-five degree angle slope and intercepts the response curve at ninety degrees.

The full nature of the invention will be understood from the accompanying drawings and the following description and claims.

Figure 1:
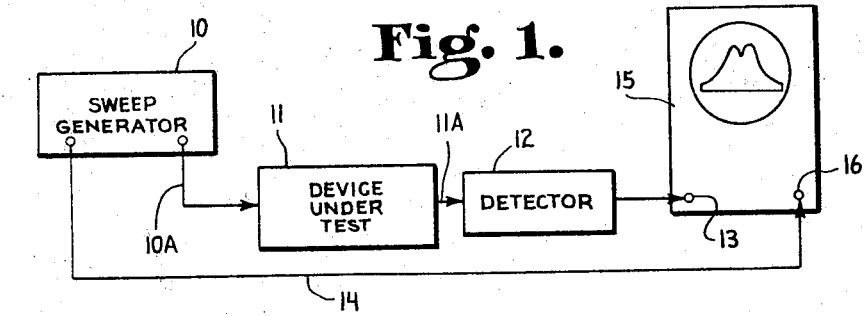
FIG. 1 is a block diagram of a conventional sweep generator test set up.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated in FIG. 1 a conventional sweep generator 10, the R-F output 10A of which is coupled to the device under test 11. The output 11A of the device under test is fed into a detector 12 which is in turn coupled to the vertical input 13 of an oscilloscope 15. The horizontal drive 14 of the oscilloscope 15 is provided by the sweep generator 10 to the horizontal input terminal 16 of the oscilloscope 15. The horizontal drive is synchronized with the R-F output so that a single trace from the left side of the scope to the right side of the scope occurs simultaneously with the change in R-F output frequency from the minimum output frequency to the maximum output frequency. The vertical input of the scope receives a constant voltage when the horizontal sweep moves from the maximum output frequency to the minimum output frequency because of the operation of the blanking signal provided by the sweep generator 10.

Figure 2:
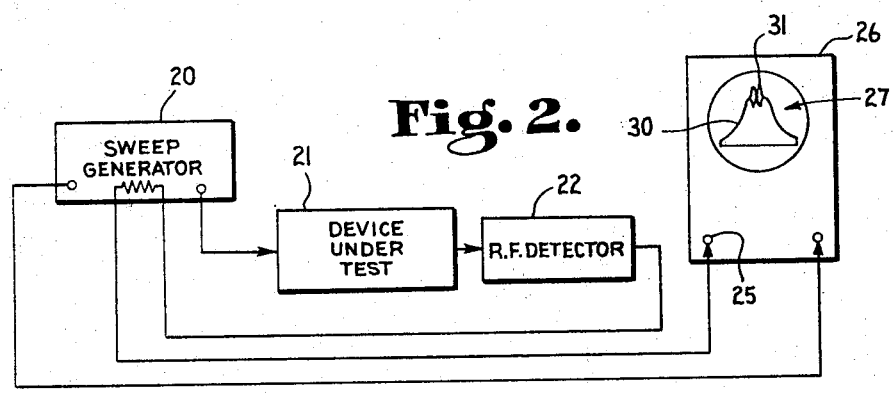
FIG. 2 is a diagram similar to FIG. 1 of a conventional sweep generator incorporating a marker system.

Referring to FIG. 2, the sweep generator 20 provides an R-F output to the device under test 21 whose output is coupled to the R-F detector 22. Instead of direct coupling of the R-F detector to the vertical input 25 of the oscilloscope 26, the R-F detector output is coupled back to the sweep generator 20 where a marker is added to the signal. The signal plus the marker is then placed on the oscilloscope which includes the response curve 30 and the marker 31.

Figure 3:
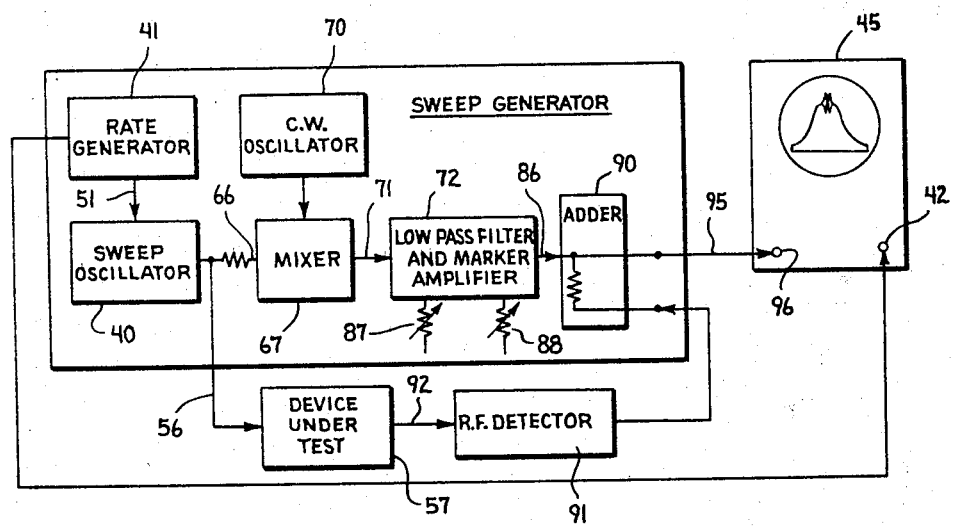
FIG. 3 is a block diagram similar to FIG. 2 but showing additional components of the sweep generator.

FIG. 3 shows further details of the internal components of the sweep generator. Thus, there is provided a sweep oscillator 40 which is controlled by rate generator 41. The rate generator 41 is coupled to the horizontal input 42 of the oscilloscope 45 to provide the proper linear sawtooth voltage in phase with the linearly varying output frequency of the sweep oscillator. The rate generator 41 controls the sweep generator so as to cause it to produce the proper uniformly varying and linearly varying output frequency.

Figure 5:
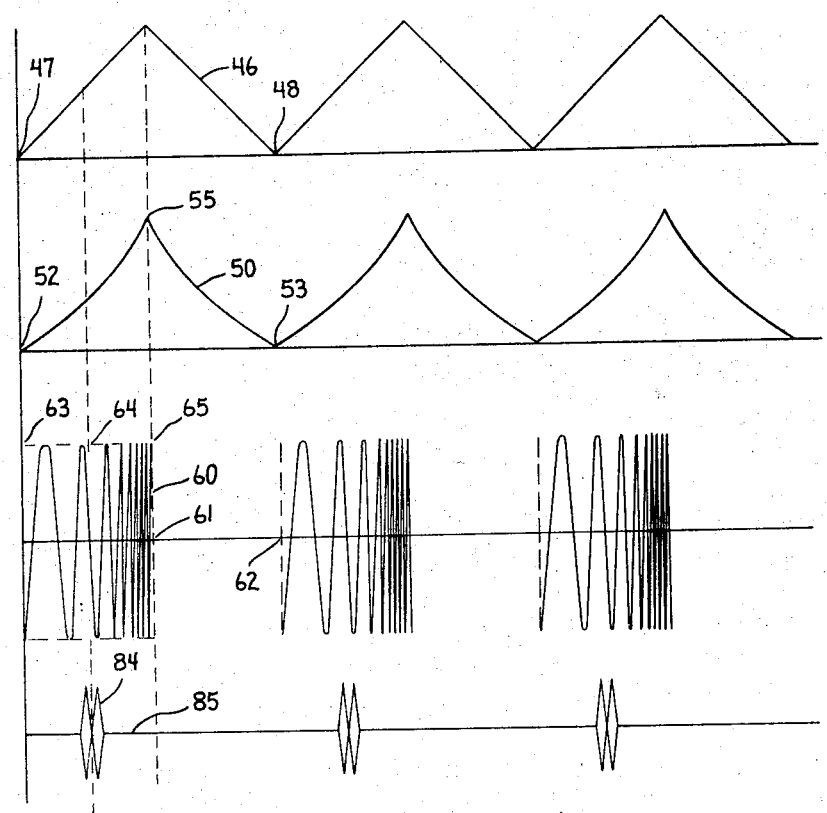
FIG. 5 is a graph showing various output signals of the components of FIG. 3 with portions exaggerated for clarity.

Referring to FIG. 5, the sawtooth 46 represents the voltage provided from the rate generator to the horizontal input 42. The sawtooth 46 is plotted with voltage on the vertical scale and time on the horizontal scale with a single one of the sawtooth shapes occupying one-sixtieth of a second as a representative figure. That is, the time from the point 47 to the point 48 is one-sixtieth of a second.

The wave shaped function 50 of FIG. 5 is a representation of the input control 51 from the rate generator to the sweep oscillator, said function 50 being plotted with voltage on the vertical scale and time on the horizontal scale. Thus, the time taken from the point 52 to the point 53 is equal to the time from the point 47 to the point 48. As a representative figure, in the above mentioned specific embodiment (Model SM-2000) the voltage at point 55 is 120 volts.

Referring to FIG. 3, the output 56 of the sweep oscillator is coupled to the device under test 57. The output 56 is shown by the function 60 of FIG. 5. Of course, the actual frequency in FIG. 5 as well as the change in frequency is greatly exaggerated and expanded horizontally for clarity. The function 60 is plotted with voltage on the vertical scale and the same time calibration on the horizontal scale as in the first two above mentioned functions. It can be seen that from the point 61 to the point 62 there is no oscillatory output voltage to the device under test. This effect is accomplished by means of the blanking signal provided by the rate generator to the sweep oscillator. In one specific example of the frequency of the function 60 at the point 63 is 90 mc., the center frequency at 64 is 100 mc., and the maximum frequency of the function 60 is 110 mc., at the point 65.

A sample of the output of the sweep oscillator is coupled at 66 to a mixer 67 which also receives the constant frequency output of a CW oscillator 70. The output frequency of the CW oscillator 70 is variable between the two outside frequencies, $f1$ and $f2$, that is the maximum and minimum frequency of the sweep oscillator. Assuming for the moment that the CW oscillator is set at 100 mc., it can be appreciated that the difference frequency output of the mixer 67 will be zero each time the sweep oscillator passes through 100 mc. The output 71 of the mixer 67 is fed into a low pass filter and marker amplifier 72. The component 72 is constructed to pass all frequencies below 200 kc. as a representative figure but to block all higher frequencies. Thus, each time the input frequency to the mixer from the sweep oscillator nears the frequency of the CW oscillator the filter and amplifier 72 will pass a signal shaped like the signal 80 in FIG. 4. However, as the sweep oscillator frequency becomes equal to the CW oscillator frequency the two will cancel out with a difference frequency of zero at the point 81 in FIG. 4. As the sweep oscillator frequency continues to change, the mirror image of the signal 80 will be produced at 82. Of course, at other frequencies of the sweep oscillator which frequencies are substantially different than the constant frequency of the CW oscillator, the low pass filter 72 will prevent any signal from passing therethrough.

Referring to FIG. 5, the function 85 represents the output of the component 72. Of course, the function 85 is squeezed up with relation to time so that the birdy marker 84 is relatively narrow in the horizontal direction. Schematically shown at 87 and 88 in FIG. 3 are shape and size controls for the birdy marker of FIG. 4. The shape control 87 merely varies the maximum frequency pass of the component 72. Thus, if it is desired to narrow the marker, the amount of frequency pass is decreased. The control 88 varies the amount of amplification of the marker and thus varies the size of the marker.

Figure 4:
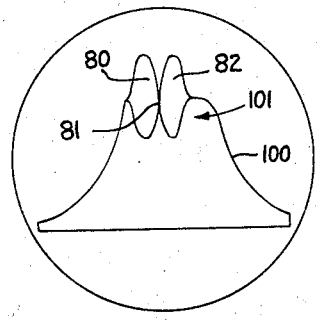
FIG. 4 is an elevational view of a typical scope display showing a birdy marker on the response curve of a device under test.

The output 86 of the filter and marker amplifier is fed into an adder 90. The adder 90 also receives the output of the R-F detector 91 whose output is the envelope of the output 92 of the device under test. The output 95 of the adder 90 is coupled to the vertical input 96 of the oscilloscope 45. It can be appreciated that the scope presentation will therefore appear as shown in FIG. 4 with the response curve 100 of the device under test having added thereto the marker 101 including the portions 80, 81 and 82. The above described marker system is commercially available.

Figure 6:
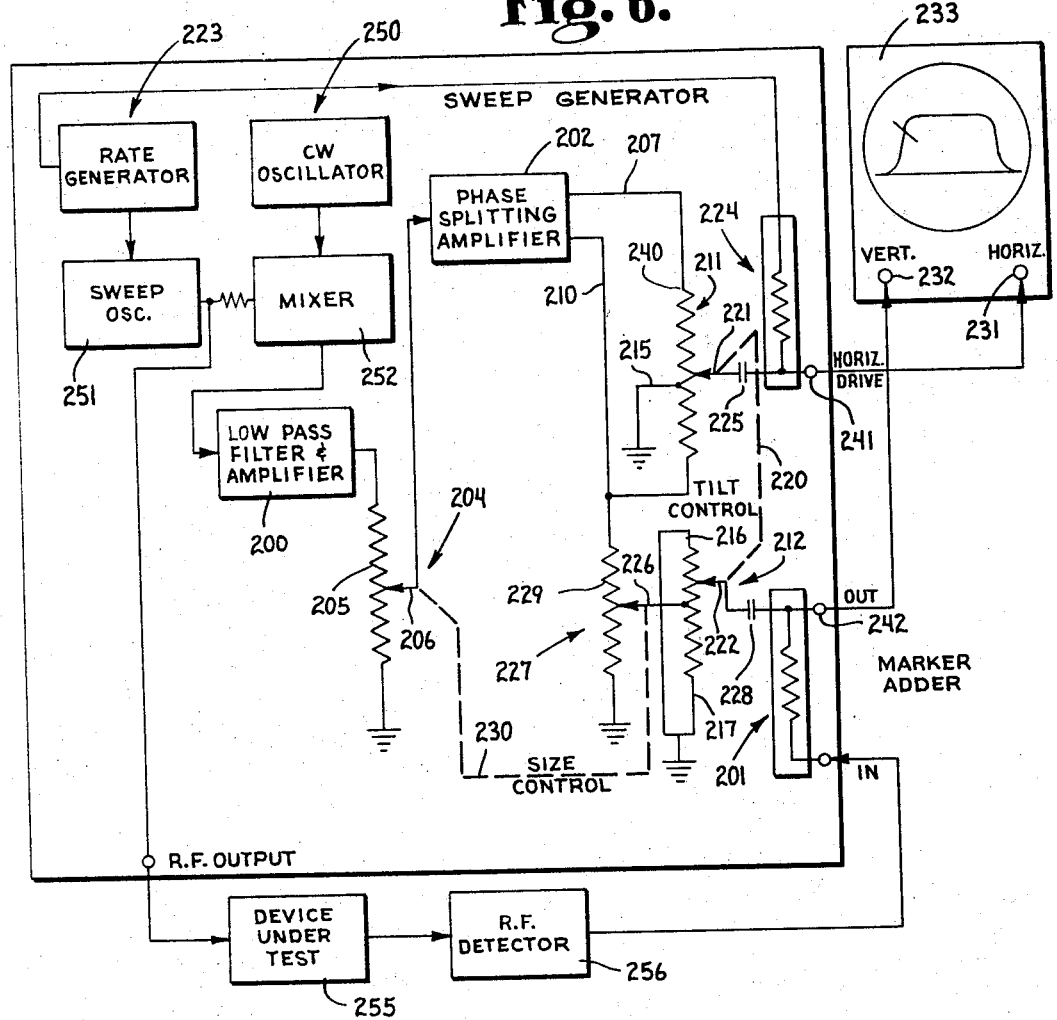
FIG. 6 is a schematic diagram of a sweep generator incorporating means for controlling the tilt of a marker.

Referring to FIG. 6, there is illustrated a sweep generator which is identical to the sweep generator of FIG. 3 except that additional circuitry is added to the sweep generator between the low pass filter and marker amplifier 72 and the adder 90 of FIG. 3. Thus, instead of the output of the low pass filter and amplifier 200 being coupled directly to the adder 201, the output is fed into a phase splitting amplifier 202. In order to obtain the proper input amplitude for the amplifier 202, the output of the low pass filter and amplifier is divided by potentiometer 204 such that the voltage appearing at the contact arm 206 is a selected fraction of that appearing at the low pass filter and amplifier output.

The phase splitting amplifier has two outputs 207 and 210 which are identical except that they are 180 degrees out of phase. One of the outputs may be in phase with the input and the other 180 degrees out of phase with the input. In other words, if the signal at 206 is changing in a positive direction, the signal at 210 changes simultaneously in a positive direction and the signal at 207 changes simultaneously in a negative direction. The phase splitting amplifier is conventional and consequently will not be described herein. Such phase splitting can be accomplished, for example, by a cathode follower circuit with one output across the cathode resistor and one across the plate resistor, by a single tube paraphase amplifier such as is shown in FIGS. 5–22 of Basic Electronics, Navpers 10087, published by the United States Printing Office, Washington, D.C. in 1955, or by a suitable transistor circuit.

There is also provided in the circuit a pair of center tapped potentiometers 211 and 212. The center tap 215 of potentiometer 211 is grounded while the end points 216 and 217 of the potentiometer 212 are grounded. The contact arms or wipers 221 and 222 of the respective potentiometers are ganged or mechanically connected together and are controlled by a tilt control or knob 220. It can be appreciated that when the tilt control 220 is in the center position no marker output appears at 221 and therefore the output connected to the horizontal input of the oscilloscope or recording device consists only of the horizontal drive waveform from the rate generator 223. This horizontal drive waveform is fed through the adder 224 to horizontal output terminal 241 thence to the horizontal terminal 231 of the oscilloscope 233. The wiper 221 is coupled to the adder 224 through capacitor 225.

Figure 8:
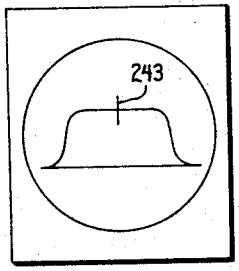

Also in this center position of the tilt control 220, the contact arm 222 of the pot 212 is connected directly to the wiper 226 of a potentiometer 227. The potentiometer 227 includes a resistor 229, one end of which is connected to the output 210 and the other end of which is grounded. The capacitor 228 couples the wiper 222 to the marker adder 201. Thus, with tilt control 220 in the center position a portion of the marker signal at 210 is added to the vertical deflection input 232 of the oscilloscope 233 and produces a vertical birdy marker 80, 81 and 82 as shown in the FIG. 4 response curve on the display of the oscilloscope 45 or a pulse marker 243 as shown in FIG. 8.

Of course, if the birdy marker is sufficiently squeezed up in the horizontal direction it will approach the shape of the pulse marker. It should also be understood that while the present device is being described in connection with birdy marker circuitry in FIG. 6, it is also fully applicable to pulse marker circuitry. The amplitude of the marker on the scope will depend on the position of the wiper arm 206 of potentiometer 204 and also on the position of the contact arm 226 on the resistor of pot 227. As illustrated, the wipers 206 and 226 are ganged or mechanically connected together and are controlled by a size control or knob 230.

It can be appreciated that the tilt control 220 is movable to cause the wipers 221 and 222 to move simultaneously together to the upward end (as viewed in FIG. 6) or to the downward end (as viewed in FIG. 6) of the potentiometers 211 and 212. Assuming that the tilt control 220 is a knob and can be turned clockwise or counterclockwise and further assuming that the knob is turned to its extreme clockwise or counterclockwise position, the signal present at either the output of the phase splitting amplifier 207 or the output of the phase splitting amplifier 210 will be superimposed upon the horizontal drive waveform in the adder 224 so that the output of the sweep generator at 241 which is coupled to the oscilloscope horizontal input 231 will include not only the horizontal sweep but also will include a component of the marker signal. It will also be noted that the contact arm 222 of the potentiometer 212 by reason of its mechanical coupling through the tilt control 220 will be positioned at the end 216 or the end 217 of the resistor of potentiometer 212. Since these end points are grounded, the contact arm 222 will be grounded and no marker signal will be added to the vertical deflection output terminal 242 by the adder 201. Thus, in either of these extreme positions the birdy or the pulse marker will only be added to the horizontal waveform by the adder 224 and will produce a completely horizontal marker.

Figure 7:
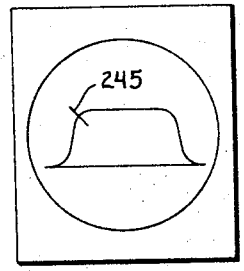
FIGS. 7, 8 and 9 are views similar to FIG. 4 of typical scope displays produced by the marker system of the present invention.
Figure 9:
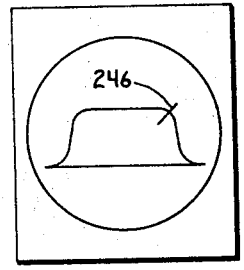

In all positions of the tilt control except for the extreme end positions and except for the center position thereof, some marker signal will be coupled into both the vertical and the horizontal inputs 231 and 232 of the oscilloscope (or recording device) and the resulting marker will have the direction that corresponds to the vectorial sum of the two deflecting marker signals. FIG. 8 shows the marker as it might appear if it is a pulse marker and when the tilt control is centered so that the contact arms of the potentiometers are at the center taps of the potentiometers. FIGS. 7 and 9 show the pulse marker 245 and 246 that can be produced by turning the tilt control toward either the clockwise or the counterclockwise end, respectively, of its travel. It can be appreciated, therefore, that the tilt control by provision of the two center tap potentiometers with their unique coupling to the two outputs 207 and 210 makes possible adjustment of a marker through 180 degrees from a leftward extending horizontal position through a vertical position to a rightward extending horizontal position.

The size control or knob 230 makes it possible to control the amplitude of the marker regardless of its angular direction. This is true because the position of the contact arm 206 always controls the input signal into the phase splitting amplifier 202. Because of the fact that the potentiometer 227 has its contact arm ganged to the contact arm of the potentiometer 204, adjustment of the size control also causes an additional amplitude control of the signal delivered to the vertical output 242 of the sweep generator.

Referring again to FIG. 7, there is illustrated in the marker 245 a desirable angular position of the marker when the marker is positioned on a response curve which is sloping, for example, at an angle of approximately 45 degrees. To obtain this angular position, the tilt control is adjusted so that the contact arm 221 is between the center tap 215 and the end 240 of the potentiometer 211. In similar fashion, the marker 246 of FIG. 9 is obtained by adjusting the tilt control so that the contact arm 221 is positioned between the center tap 215 and the end 241 of the potentiometer 211. It will be recognized that the above adjustment of potentiometer 211 will produce a similar adjustment of potentiometer 212 since these potentiometers are ganged together.

It will be clear from the above description that the present invention provides an improved sweep generator which makes possible the tilting of a marker, such as a pulse marker or a birdy marker, to facilitate interpretation of a response curve from a device under test. As illustrated in FIG. 6, the various components, including the rate generator 223, the CW oscillator 250, the sweep oscillator 251 and the mixer 252, are all connected in the same interrelationship as shown in FIG. 3. Also, the signal from the sweep oscillator is delivered to the device under test 255 in the same fashion as in FIG. 3, and the output of the device under test is detected by the R-F detector 256 in order to provide an input for the adder 201 in similar fashion to the sweep generator of FIG. 3. It should also be made clear that the control 88 of FIG. 3 is replaced by the potentiometers 204 and 227 of FIG. 6.

The invention claimed is:

1. A sweep generator marker system adapted for visual display upon a time-amplitude display device comprising a sweep oscillator adapted to provide a signal of varying frequency to a device under test, a rate generator operating in synchronism with said sweep oscillator, means responsive to said sweep oscillator for producing a marker signal occurring coincident with the sweep of said oscillator through a given frequency, means for adding the detected output of the device under test and said marker signal to produce a first combination signal, means for adding the rate generator output and said marker signal to produce a second combination signal, means for applying said first combination signal to the amplitude input of said visual time-amplitude display device, and means for applying said second combination signal to the time input of said visual time-amplitude display device resulting in tilting the marker signal to a position wherein its intersection with the detected output is easier to identify.

2. The sweep generator marker system of claim 1 wherein said means for producing said first combination signal and said means for producing said second combination signal are operable to tilt said marker through 180 degrees.

3. A sweep generator marker system adapted for visual display upon a time-amplitude display device comprising a sweep oscillator adapted to provide a signal of varying frequency to a device under test, a rate generator operating in synchronism with said sweep oscillator to provide a horizontal sweep signal, means responsive to said sweep oscillator for producing a marker signal occurring coincident with the sweep of said oscillator through a given frequency, means for phase splitting said marker signal to provide two marker outputs, means for adding one of said two marker outputs to the detected output of the device under test, and means for adding one or the other of said two marker outputs to the horizontal sweep, whereby the marker signal is tilted to a position wherein its intersection with the detected output is easier to identify.

4. The sweep generator marker system of claim 2 additionally comprising means for controlling the amplitude of the marker output added to said detected output and for controlling the amplitude of the marker output added to said horizontal sweep, wherein said means for controlling comprises a first potentiometer having one end connected to one of said marker outputs and its other end connected to the other of said marker outputs, said first potentiometer being center tapped to ground, a first movable contact arm of said first potentiometer coupled to said means for adding the one or the other of said two marker outputs to the horizontal sweep, a second potentiometer having the opposite ends thereof connected to ground and having a center tap connected to said one of said marker outputs, a second movable contact arm of said second potentiometer coupled to said means for adding the one of said two marker outputs to the detected output of the device under test.

5. The device of claim 4 wherein said contact arms are ganged together so that movement of said first movable contact arm occurs simultaneously with movement of said second movable contact arm.

6. The device of claim 4 additionally comprising a third potentiometer coupled at one end to ground and at the other end to said means for producing a marker signal, a third movable contact arm of said third potentiometer providing the input to said phase splitter means, a fourth potentiometer coupled at one end to said one marker output and coupled at the other end to ground, a fourh movable contact arm of said fourth potentiometer providing the input to said second resistor center tap, so that the length of the marker signal displayed on the time-amplitude display device may be varied.

7. The sweep generator marker system of claim 2 comprising means for controlling the amplitude of the marker output added to said detected output of the device under test and for controlling the amplitude of the marker output added to said horizontal sweep.

8. The sweep generator marker system of claim 7 wherein said means for controlling the amplitude of the two marker outputs simultaneously increases the amplitude of the marker output added to the detected output of the device under test and decreases the amplitude of the marker output added to the horizontal sweep or simultaneously decreases the amplitude of the marker output added to the detected output of the device under test and increases the amplitude of the marker output added to the horizontal sweep.

9. In a sweep generator including a sweep oscillator and means responsive to said sweep oscillator for producing a marker signal each time the sweep oscillator sweeps through a given frequency, said sweep generator including a vertical output for connection to the vertical terminal of a visual time-amplitude display device and a horizontal output for connection to the horizontal terminal of a visual time-amplitude display device, the improvement which comprises: means for combining a portion of said marker signal with the horizontal output of said sweep generator during the sweep of said sweep oscillator, means for combining a portion of said marker signal with the vertical output of said sweep generator during the sweep of said sweep oscillator, and means for controlling the amplitude of said portions of the marker signal which are combined with the horizontal and vertical outputs of the sweep generator.

10. The invention of claim 9 additionally comprising phase splitter means receiving the output of said means for producing a marker signal and providing two marker outputs 180 degrees out of phase with one another, said means for combining a portion with the horizontal output comprising a first potentiometer having one end connected to one of said marker outputs and having its other end connected to the other of said marker outputs, said first potentiometer being center tapped to ground, a first movable contact arm of said first potentiometer coupled to said horizontal output, said means for combining a portion with the vertical output comprising a second potentiometer having the opposite ends thereof connected to ground and having a center tap connected to said one of said marker outputs, a second movable contact arm of said second potentiometer coupled to said vertical output.

11. The device of claim 10 wherein said contact arms are ganged together so that movement of said first movable contact arm occurs simultaneously with movement of said second movable contact arm.

12. The device of claim 10 additionally comprising a third potentiometer coupled at one end to ground and at the other end to said means for producing a marker signal, a third movable contact arm providing the input to said phase splitter means, a fourth potentiometer coupled at one end to said one marker output and coupled at the other end to ground, a fourth movable contact arm providing the input to said second resistor center tap.

13. The invention of claim 9 wherein said means for controlling the amplitude of said portions of the marker signal simultaneously decreases the amplitude of one of said portions and increases the amplitude of the other of said portions.

14. The invention of claim 9 comprising phase splitter means responsively coupled to the output of said marker signal producing means, said phase splitter means producing two marker outputs, means for combining one of said two marker outputs with the vertical output of said sweep generator, and means for combining one or the other of said two marker outputs with the said horizontal output of said sweep generator.

15. A sweep generator marker system for generating a tilting marker signal comprising
 a rate generator which produces a signal which changes with time,
 a sweep oscillator operating synchronously with said rate generator which supplies a varying frequency signal to a device under test,
 a marker generator for producing a marker signal occurring coincident with the sweep of said sweep oscillator through a given frequency, and
 means for simultaneously superimposing said marker signal on the rate generator output and output of the device under test during the sweep of said sweep oscillator.

16. The sweep generator of claim 15 wherein said means for simultaneously superimposing said marker signal on the rate generator output and output of the device under test includes means for controlling the amplitude of the marker signal added to either said rate generator output or said output of the device under test or both.

17. The sweep generator of claim 16 wherein said means for controlling the amplitude of the marker signal simultaneously increases the amplitude of the marker signal added to the rate generator output and decreases the amplitude of the marker signal added to the output of the device under test or decreases the amplitude of the marker signal added to the rate generator output and increases the amplitude of the marker signal added to the output of the device under test.

18. The sweep generator of claim 17 comprising means for simultaneously increasing the amplitude of the marker signal added to the rate generator output and the amplitude of the marker signal added to the output of the device under test or simultaneously decreasing the amplitude of the marker signal added to the rate generator output and the amplitude of the marker signal added to the output of the device under test.

19. A sweep generator marker system adapted for visual display upon a time-amplitude display device comprising
    a sweep oscillator for supplying a varying frequency signal to a device under test,
    a marker generator responsive to said sweep oscillator for producing a marker signal occurring coincident with the sweep of said oscillator through a given frequency, and
    means for coupling the output of said marker generator to both the time and amplitude inputs of said visual time-amplitude display device simultaneously with the sweep of said sweep oscillator for tilting the marker signal to a position wherein its intersection with the detected output is easier to identify.

20. A sweep generator marker system for generating a tilting marker signal comprising
    first means for generating a signal which varies in amplitude with time,
    sweep oscillator means for supplying to a device under test a signal which varies in frequency with time in synchronism with said first means,
    means responsive to said sweep oscillator for producing a frequency marker signal occurring coincident with the sweep of said oscillator through a given frequency, and
    means for simultaneously combining said frequency marker signal with the output of the device under test and with the output of said first means during the sweep of said sweep oscillator.

References Cited

UNITED STATES PATENTS

| | | | |
|---|---|---|---|
| 2,859,343 | 11/1958 | Langford et al. | 324—57 XR |
| 3,094,694 | 6/1963 | Beach | 343—5 XR |
| 3,150,316 | 9/1964 | Davis | 324—88 |

RUDOLPH V. ROLINEC, *Primary Examiner.*

E. E. KUBASIEWICZ, *Assistant Examiner.*

U.S. Cl. X.R.

315—26; 324—79, 88; 328—189